Figure 3:
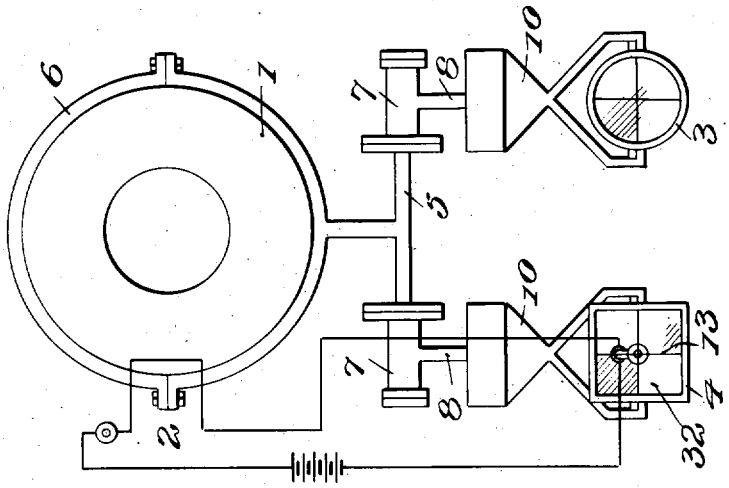

N. POGOLSKI.
METHOD OF INDICATING AND RECORDING THE AIMING OF GUNS.
APPLICATION FILED MAR. 16, 1909.
Reissued Nov. 7, 1911.
13,310.
3 SHEETS—SHEET 1.
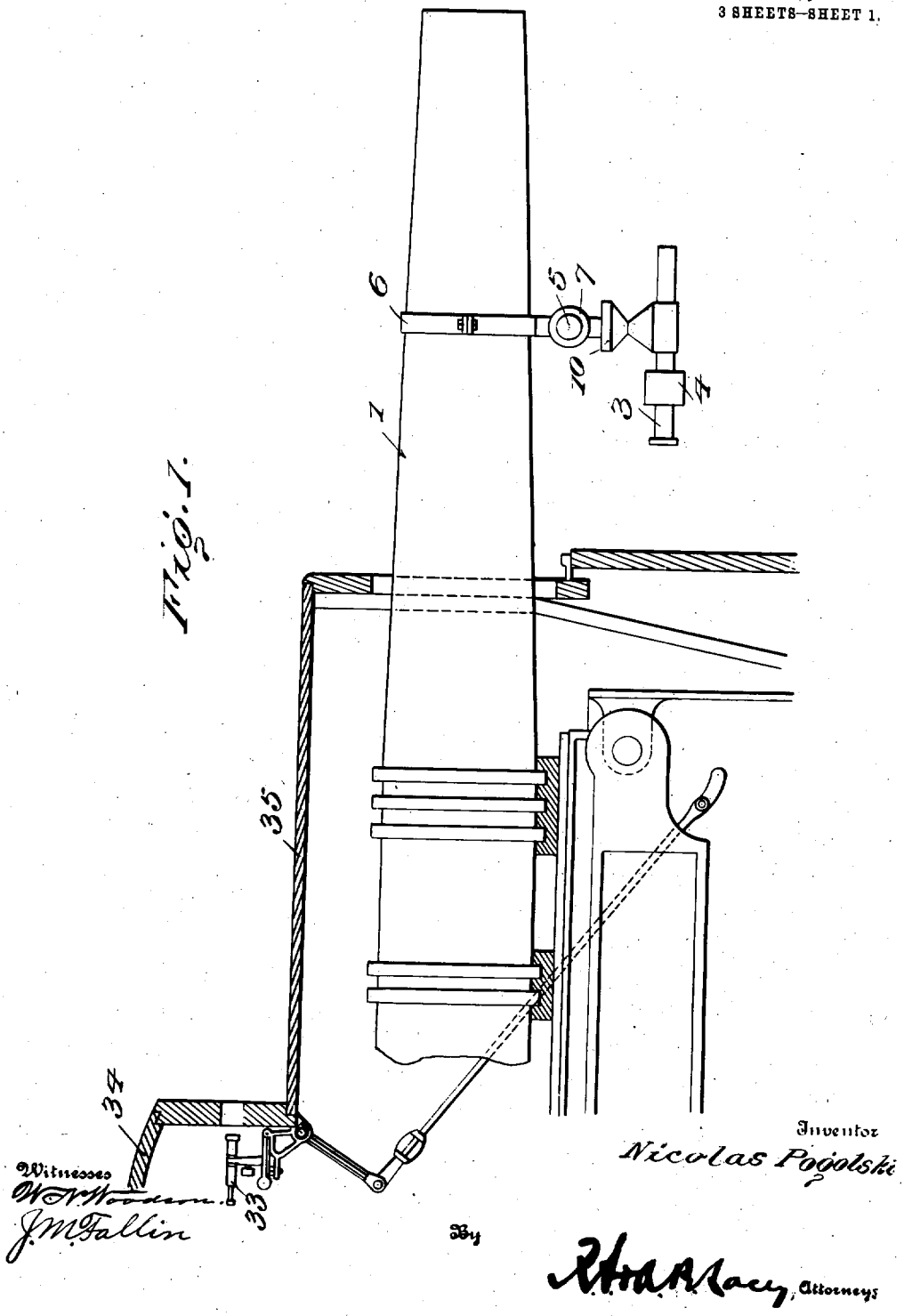
Witnesses
W. T. Woodson
J. M. Fallin
Inventor
Nicolas Pogolski
By
R. H. A. Macy, Attorneys

N. POGOLSKI.

METHOD OF INDICATING AND RECORDING THE AIMING OF GUNS.

APPLICATION FILED MAR. 16, 1909.

Reissued Nov. 7, 1911. 13,310.

3 SHEETS—SHEET 2.

Inventor

Nicolas Pogolski

Witnesses

W. T. Wooden

J. M. Fallin

By

Attorneys.

N. POGOLSKI.
METHOD OF INDICATING AND RECORDING THE AIMING OF GUNS.
APPLICATION FILED MAR. 16, 1909.
Reissued Nov. 7, 1911. 13,310.
3 SHEETS—SHEET 3.
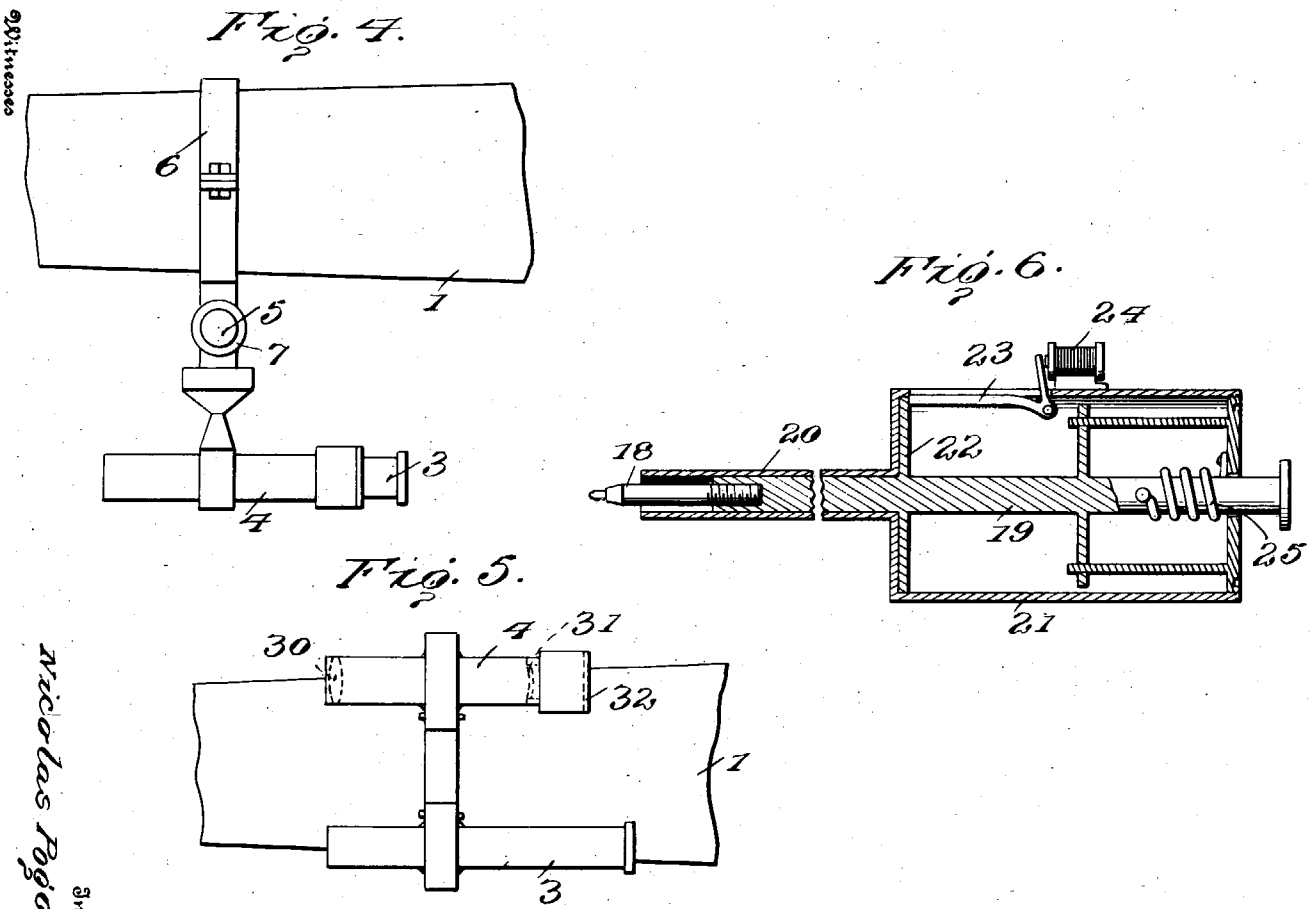
Witnesses
J. M. Fallin
W. P. Woodson
Inventor
Nicolas Pogolski.
By H. A. Lacey, Attorney.

UNITED STATES PATENT OFFICE.

NICOLAS POGOLSKI, OF WILKES-BARRE, PENNSYLVANIA.

METHOD OF INDICATING AND RECORDING THE AIMING OF GUNS.

13,310. Specification of Reissued Letters Patent. Reissued Nov. 7, 1911.

Original No. 906,924, dated December 15, 1908. Serial No. 418,260. Application for reissue filed March 16, 1909. Serial No. 483,865.

*To all whom it may concern:*

Be it known that I, NICOLAS POGOLSKI, a subject of the Emperor of Russia, residing at Wilkes-Barre, in the county of Luzerne and State of Pennsylvania, have invented certain new and useful Improvements in Methods of Indicating and Recording the Aiming of Guns, of which the following is a specification.

The present invention has reference to a method of indicating and recording the aiming of guns, the prime object of the invention residing in the substitution for the enormously expensive methods heretofore employed in target practice of another which is not only simpler, more convenient and more effective, but also may be put into practice at a hardly appreciable cost.

The improved methods briefly described, consist in registering the position of the target relatively to the position of the line of vision of the sighting telescope at the exact moment of the discharge of the gun.

In carrying out this method a photographic apparatus adapted for instantaneous photography of distant objects and a telephotographic apparatus are suspended from the gun in such a manner that their optical axes remain constantly parallel with that of the bore of the gun, the sighting pointer's telescope being set at zero of the scale. Thus the four axes, namely that of the photographic apparatus, of the telephotographic apparatus, of the bore of the gun, and of the sighting or pointer's telescope remain constantly parallel with each other and move at all times in parallel planes. If, then, the point of a pencil be applied to the image of a target (say, of a battle ship) projected upon the ground glass of the telephotographic apparatus, and then constantly kept on the image following its movement, it is obvious that a line will be traced upon the ground glass corresponding to the course followed by the target ship, and it is obvious that by the termination of such line caused either by the automatic or manual removal of the pencil point from the ground glass at a given signal, that is, the exact moment of the firing of the gun, the accuracy or inaccuracy of the gun pointer in sighting the gun will be indicated by the position of the image of the target relative to the two crossed lines that are traced for that purpose on the ground glass through the optical axis of the telescope. It is evident therefore that the actual discharge of the gun is unnecessary to determine the accuracy of the aim inasmuch as the actuation of the firing attachment (ordinarily accomplished by the application of pressure upon a key, with a resultant closing of an electrical circuit) is simultaneous with and effects the withdrawal of the pencil point from the ground glass.

Figure 2:
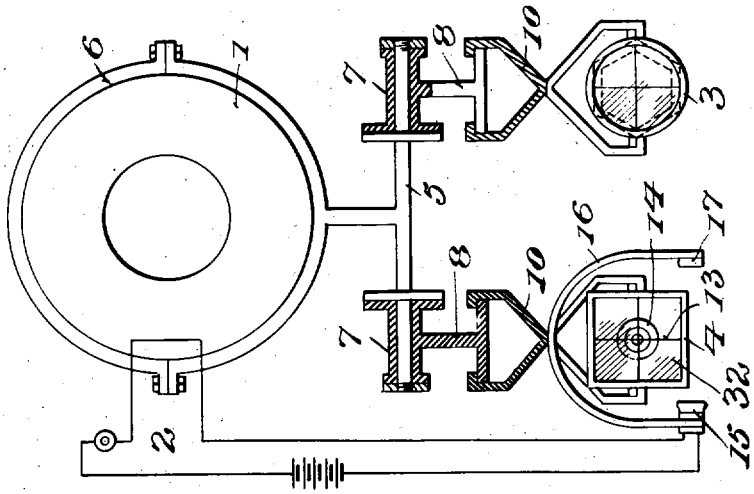

For a full understanding of the invention, reference is to be had to the following description and accompanying drawings in which:

Figure 1 is a side view illustrating one embodiment of the invention; Fig. 2 is a diagrammatic view of the invention in its simplest form; Fig. 3 is a similar view of a modified form of the invention; Figs. 4 and 5 are respectively, fragmentary side and bottom plan views of the apparatus illustrated in Fig. 1; and Fig. 6 is an enlarged detail view in section of one embodiment and means for automatically effecting the withdrawal of the pencil point from the ground glass at the actuation of the firing attachment.

Corresponding and like parts are referred to in the following description and indicated in all the views of the accompanying drawings by the same reference characters.

Referring to the drawings and now especially to Figs. 1, 2, 3 and 4, 1 designates generally the gun; 2 the electrical firing attachment therefor; 3 the photographic apparatus; 4 the telephotographic apparatus, which is a photographic apparatus, provided, in addition to the ordinary lenses, with a negative or lens, whereby the apparatus is particularly designed for photographing distant objects; and 33 the sighting apparatus which includes a pointer's telescope disposed within the hood portion 34 of the turret 35. Both the photographic apparatus and the telephotographic apparatus are suspended from a horizontal bar 5 which is in turn suspended from the gun by a strap 6 comprising upper and lower members whose adjacent ends are connected together in any preferred manner, each end of the bar 5 having secured thereto a sleeve 7 from which depends an arm 8 whose headed lower end is connected to the flanged upper end of a supporting bracket 10. To the lower end of one bracket is secured the photographic apparatus which may be employed, designated 3, and to the other bracket, the telephotographic apparatus designated 4. It will be apparent that the above arrangement affords means for the installation of the complete apparatus in the required position. The telephotographic apparatus shown in bottom plan view in Fig. 4 includes a single achromatic telescopic lens 30, a negative lens 31 and a ground glass 32, there being drawn upon the last element in an indelible way two crossing lines 13 and in addition thereto, a series of concentric circles 14. Instead of the above telephotographic apparatus any of the existing in the market can be used, provided it gives images of battle ships, say, eight thousand yards distant of sufficient size and luminosity to be easily discernible in the dark. The electrical firing attachment 2 above referred to has circuited therewith a bell 15 secured to a head band 16 provided at its ends with ear drums 17 adjacent to one of which the bell above mentioned, is disposed. The head band is adapted to be worn by the gunner, who with the point of his pencil, traces upon the ground glass the course of the target. If then, the pencil point be removed from the ground glass at the exact moment that the bell is sounded, it will be apparent that the terminal of the line drawn by the pencil will indicate the precise position of the target with reference to the optical axis of the apparatus, and, in consequence, the accuracy of the sighting of the gun. While the audible signal caused by the sounding of the bell, as above described is most effective as a means of announcing the actuation of the firing attachment, it will be apparent that the bell may be replaced by a sparking coil, the discharge spark serving as a visible signal of such actuation. The spark-gap can be arranged on the pencil between the tracing point and the place of the application of the hand. The men who operate the photographic and telephotographic apparatus occupy seats suspended from the gun and disposed in such a manner as to be screened from the light.

In the modification shown in Fig. 2, the retraction of the pencil point from the ground glass is effected automatically upon the actuation of the firing attachment. In this form of the invention, the pencil 18 has its rear end fitted in a threaded socket formed in the forward end of an endwise movable rod 19. The forward portion of this rod is incased by a sleeve 20 formed integral with the front wall of a cylindrical shell or housing 21, while its rear end which is headed extends through an opening formed in the rear wall of the housing in alinement with the bore of said sleeve. Intermediate its ends, the pencil carrying rod is provided with an integral annular flange 22 which is located interiorly of the housing and is held normally in contact with the front wall of the latter by means of its engagement with the interiorly located trigger arm of the V-shaped armature 23 of an electric magnet 24 circuited with the firing attachment. When, therefore, the magnet becomes energized upon the actuation of the firing attachment, the trigger arm, which is movable through a longitudinal slot formed in the upper wall of the housing will be released from engagement with the flange 22, whereupon the rod 19 will be retracted under the tension of a retractile coil spring 25 which embraces the rear portion of said rod and is secured at opposite ends thereto and to the rear wall of the housing. This inward movement or retraction of the rod 19 will withdraw the pencil point from the ground glass as will be obvious. In connection with this form of the invention, it may be stated that the housing, a detailed construction of which and its attendant parts is illustrated in Fig. 5, is held in the hand of the gunner who traces the course of the target upon the ground glass as in the first mentioned instance.

From the foregoing, it will be understood, that there is obtained in both forms of the invention, an absolutely accurate record of what is tantamount to every shot fired, the termination of the lines drawn upon the ground glass indicating the exact position of the target with reference to the optical axis of the telephotographic or recording apparatus. It will also be apparent that by reason of the fact that there is no actual firing of the gun in any instance, the above described methods of training the gunners may be put into practice at a hardly appreciable cost, while the convenience of such method admits of the possibility of continuous target practice irrespective of whether the ship is in port or at sea. The practice can likewise be continued at night by electric lighting.

In connection with the form of the invention shown in Fig. 1, it may be stated that after a gunner has become sufficiently familiar with the operation of the apparatus as a whole, and has become possessed of the requisite skill, the use of the pencil employed in indicating upon the ground glass the position of the projected image may be discarded, and the position of said image determined merely by observation, the sounding of the bell, or the appearance of the spark indicating the exact instant at which the firing mechanism is actuated.

The superiority of the above method over the actual target practice as a means of training can be claimed from two points of view; first, by these methods all variable factors, for instance as the errors in the valuation of the distance, the variations in the ballistic properties of gunpowder, the eccentricity of projectiles, etc., are eliminated; consequently the obtained result gives a true criterion for the skill of gun-pointers; and second these methods, and they alone afford the possibility of training in shooting at torpedo boats when approaching the battle ship at a speed of thirty (30) miles an hour.

The method of recording the aiming of a gun by means of actual photography has been proposed as is well known, but such method although of an absolute precision possesses besides the draw backs of being slow and of entailing considerable expense, an inherent defect of being unavailable at sunset and in some cases at night excepting with the use of electric lighting; while these are precisely the instances where a good aiming and consequently a thorough training becomes a matter of paramount importance because the missing of the mark in the daylight by the gunner of a twelve inch gun would be of comparatively small importance, while at night one sole failure on the part of the quick-firing gunner might mean imminent peril to the battleship thence the advisability of supplementing the photographic method by another not possessing the above drawbacks. On the other hand the efficiency of the method of direct observation is wholly dependent on the proper selection and training of the controller, therefore some means must be provided for the selection and training of, at least, one man on the battleships; this man might select and train any number of controllers by observing them at work. It is for the purpose of training the first controller that the photographic apparatus is included in the system. But still the greatest advantage would be derived from the above method if they could be used in actual warfare, viz., when the first shot has been fired and the mark has been missed and when it would have been of the highest importance to know whether the cause of the failure was a faulty pointing, or some errors in the valuation of the variable factors.

It is of course understood that in the actual shooting, the gun pointer's telescope is directed straight on the target, while the bore of the gun has a different position according to the range of shooting and the consequent elevation and deflection. Inasmuch as the telephotographic apparatus must be directed on the target, in carrying out my invention it follows that to elevate the gun for the purpose of obtaining the proper range and the like would necessitate an arrangement whereby the axis of the telephotographic apparatus would be parallel to that of the pointer's telescope, and the above named two axes would necessarily, in pointing, have to move in parallel planes. It is manifest that such an arrangement would necessitate a complicated mechanism to effect such parallel motion between the two axes, such as already exists between the gun and the pointer's telescope, and the same would involve considerable expense and unnecessarily complicated mechanism. To obviate this, I reasoned as follows,—whenever there is no actual shooting it is absolutely immaterial how the gun lies. It can be in any position. Hence in the use of my invention, I have the gun trained directly on the target, and suspend the telephotographic apparatus parallel with the bore of the gun, and make the latter parallel with the axis of the pointer's telescope by sighting the latter at zero of the scale. Thus while the gun is in position for point blank firing, it is to be understood that it is not always horizontal, as the target may be at a considerably higher or lower elevation than the gun. Of course the telephotographic apparatus is raised and lowered with the gun and the sighting telescope has its axis parallel with the axis of the bore of the gun and the telephotographic apparatus. The inclination of the gun to assume a point blank position with the target which is higher or lower than itself is of course commensurate with the inclination of the sighting or pointer's telescope, but as the mechanism for the simultaneous movement of these two parts forms no part of my present invention, I have deemed it unnecessary to specifically describe or illustrate the same.

Having thus described the invention, what is claimed as new is:

1. The method of indicating the aiming of guns which consists in projecting the image of an object upon the ground glass of a photographic apparatus having its optical axis constantly parallel with that of the sighting telescope, said ground glass having reference lines thereon: in tracing upon the ground glass the course followed by the object; in signaling the actuation of the firing attachment, and in terminating the tracing at the instant of the signaling.

2. The method of indicating the aim of guns which consists in projecting the image of a distant object upon the ground glass of a photographic apparatus having its optical axis constantly parallel with that of the sighting apparatus; in manually tracing upon the ground glass the course followed by the object; and in terminating such tracing simultaneously with the actuation of the firing attachment.

3. The method of indicating the aim of guns which consists in projecting the image of a distant object upon the ground glass of a photographic apparatus having its optical axis constantly parallel with that of the sighting apparatus; in tracing upon the ground glass the course followed by the object; and in terminating such tracing simultaneously with the actuation of the firing attachment.

4. The method of indicating the aim of guns which consists in projecting the image of a distant object upon the ground glass of a photographic apparatus having its optical axis constantly parallel with that of the sighting apparatus in tracing with a pencil upon the ground glass the course followed by the object; and in withdrawing the pencil point from contact with the glass simultaneously with the actuation of the firing attachment.

5. The method of indicating the aim of guns which consists in projecting an image of a distant object upon the ground glass of a photographic apparatus having its optical axis constantly parallel with that of the sighting apparatus; in tracing with a pencil upon the ground glass the course followed by the object; and in automatically withdrawing the pencil point from contact with the ground glass at the instant the firing attachment is actuated.

6. The method of indicating the aim of guns which consists in projecting the image of a distant object upon the ground glass of a photographic apparatus having its optical axis constantly parallel with that of the sighting telescope; in manually tracing upon the ground glass the course followed by the object; in signaling the actuation of the firing attachment; and in terminating the tracing at the instant of the signaling.

7. A method of indicating the aim of guns which consists in projecting the image of a distant object upon the ground glass of a photographic apparatus, having its optical axis constantly parallel with that of the sighting apparatus; in tracing the course followed by the object upon said ground glass, and in terminating such tracing at the instant the firing attachment is actuated.

In testimony whereof, I affix my signature in presence of two witnesses.

NICOLAS POGOLSKI.

Witnesses:
W. N. Woodson,
Frederick S. Stitt.